3,378,463
METHOD OF MEASURING ENZYME ACTIVITY
George G. Guilbault, Edgewood, and David N. Kramer, Stevenson, Md., assignors to the United States of America as represented by the Secretary of the Army
Filed June 22, 1965, Ser. No. 466,138
9 Claims. (Cl. 195—103.5)

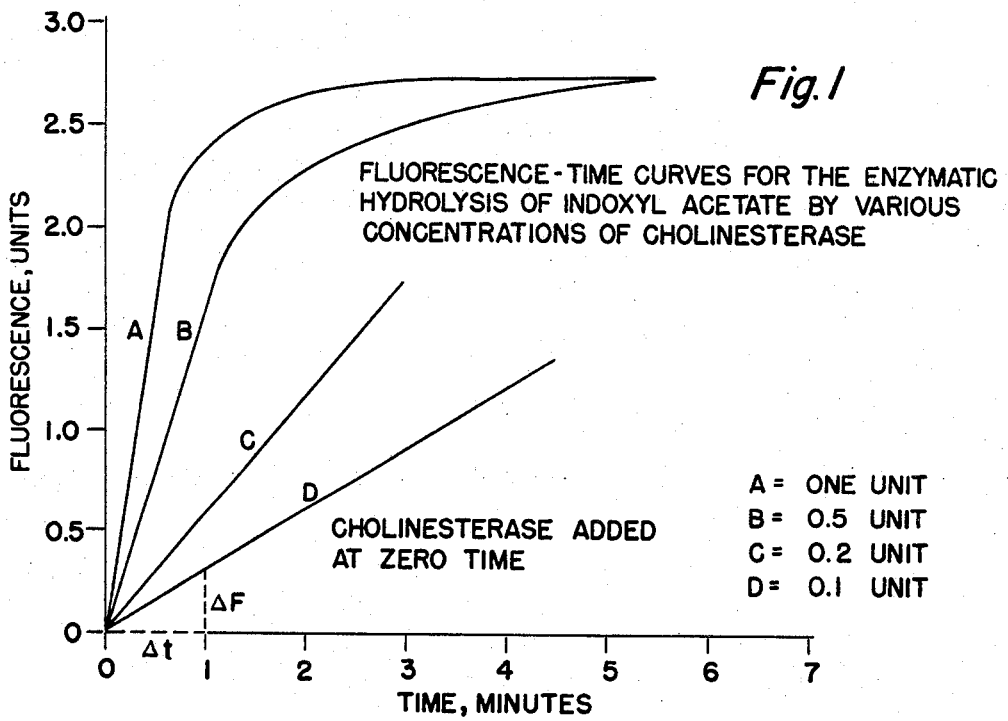
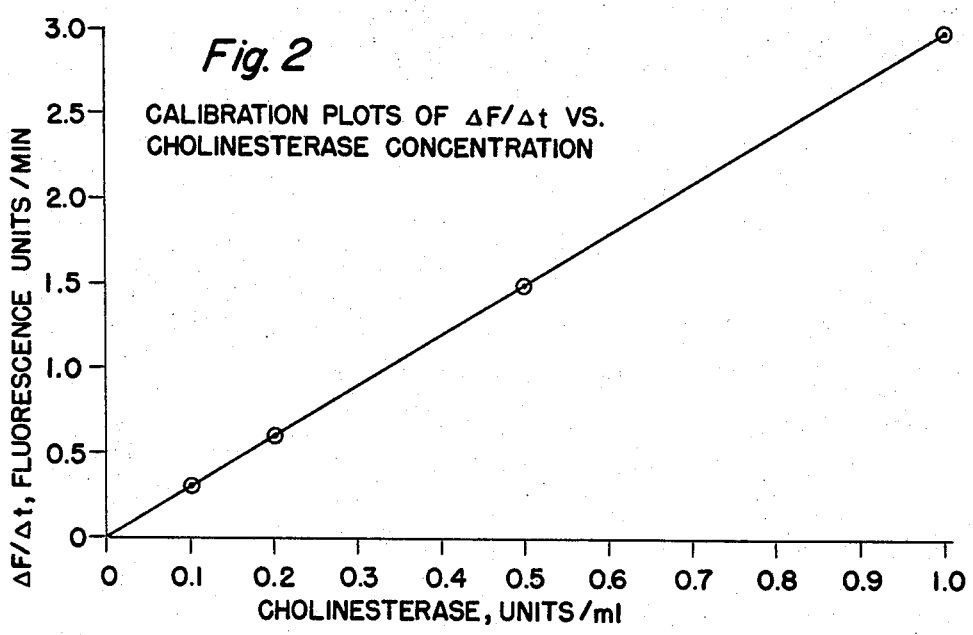

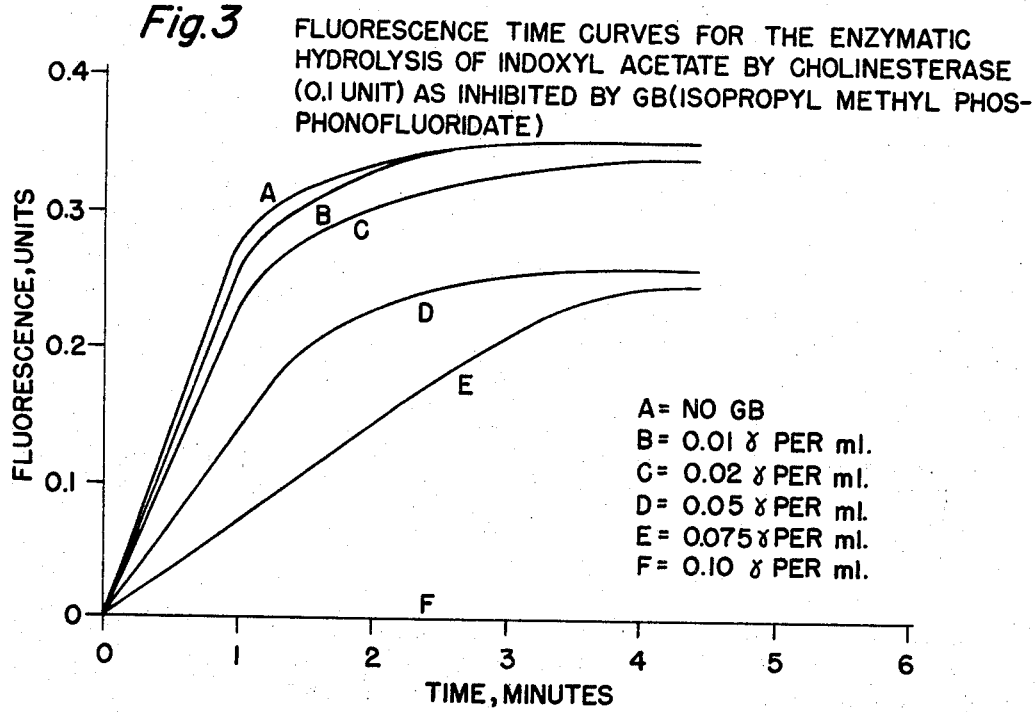
Fig. 3 FLUORESCENCE TIME CURVES FOR THE ENZYMATIC HYDROLYSIS OF INDOXYL ACETATE BY CHOLINESTERASE (0.1 UNIT) AS INHIBITED BY GB (ISOPROPYL METHYL PHOSPHONOFLUORIDATE)
A = NO GB
B = 0.01 γ PER ml.
C = 0.02 γ PER ml.
D = 0.05 γ PER ml.
E = 0.075 γ PER ml.
F = 0.10 γ PER ml.
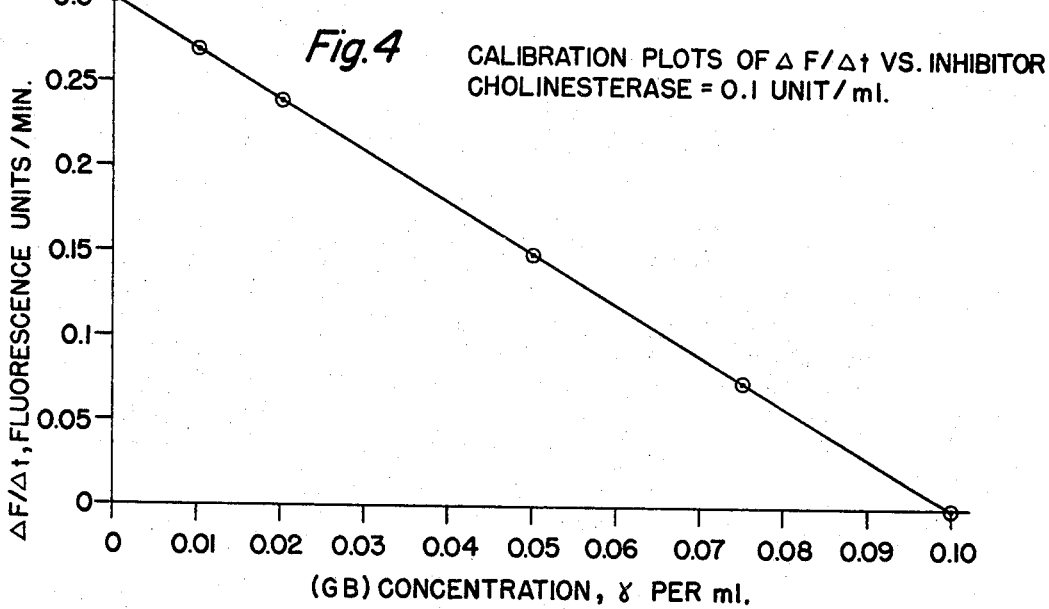
Fig. 4 CALIBRATION PLOTS OF ΔF/Δt VS. INHIBITOR CHOLINESTERASE = 0.1 UNIT/ml.
INVENTORS
George G. Guilbault
David N. Kramer United States Patent Office 3,378,463
Patented Apr. 16, 1968

ABSTRACT OF THE DISCLOSURE

Resorufin esters serve as fluorogenic substrates in determining the activity of cholinesterase and phosphatase.

This invention described herein may be manufactured and used by or for the Government of the United States of America for governmental purposes without the payment to us of any royalty thereon.

---

This invention relates to a method of measuring enzyme activity at very low substrate concentrations.

Numerous methods have been described in the prior art for the determination of cholinesterase based on enzymatic hydrolysis. Most of these methods involve either the measurement of the rate of acid production by pH change or by the manometric determination of carbon dioxide liberation, or utilize colorimetric or electrochemical techniques.

The prior art teaches that the previous colorimetric, manometric and electrochemical procedures for horse serum cholinesterase are limited to substrate concentrations greater than $10^{-5}$ M, because of limitations in molar absorptivities, or measurement of gas volumes, or change in potential.

One of the objects of our invention is to develop a fluorometric method for measurement of extremely small concentrations of substrate and enzyme.

Another object of our invention is to prepare a series of esters of various fluorescent materials, themselves non-fluorescent which upon hydrolysis by enzymes will produce easily measured products.

It has been reported that fluorogenic substrates are generally several orders of magnitude more sensitive to measurement than chromogenic ones.

According to our invention resorufin concentrations as low as $10^{-8}$ M give a measureable fluorescence reading, approximately 100–1000 times less product need be formed from the hydrolysis of a fluorogenic substrate than from a chromogenic one. Hence much lower enzyme concentrations can be assayed, fast enzymic reactions can be followed by this technique (since only low enzyme concentrations need be used), and true initial rates of reaction may be measured, since only a very small change in substrate concentration ($10^{-8}$ M) gives a significant change in fluorescence. Furthermore, this method also provides a means of measuring lower inhibitor concentrations, since one is able to measure low enzyme and substrate concentrations.

By the method of our invention it has been found possible to measure enzyme activity at very low substrate concentrations ($10^{-5}$ M to $10^{-8}$ M) by hydrolyzing a non-fluorescent ester in the presence of a buffer having a pH within the range of 6 to 10 with an enzyme to produce a highly fluorescent material, registering the rate of change in fluorescence with time, $\Delta F/\Delta t$; determining the slope of the curve $\Delta F/\Delta t$; recording the calibration plots of $\Delta F/\Delta t$ versus enzyme concentration whereby the unknown concentration of enzyme may be determined.

Other and further objects and advantages will be understood by those skilled in the art or will be apparent or pointed out in this disclosure.

The method of measuring enzyme activity at very low substrate concentrations and the method of measuring inhibitor concentrations at very low enzyme concentrations are illustrated in the accompanying drawings, in which:

FIGURE 1 is a graph illustrating fluorescent time curves for the enzymatic hydrolysis of indoxyl acetate by various concentrations of cholinesterase.

FIGURE 2 is a graph illustrating calibration plots of $\Delta F/\Delta t$ versus cholinesterase concentration.

FIGURE 3 is a graph illustrating fluorescent time curves for the enzymatic hydrolysis of indoxyl acetate by cholinesterase (0.1 unit) as inhibited by GB.

FIGURE 4 is a graph illustrating calibration plots of $\Delta F/\Delta t$ versus inhibitor (GB) concentrations wherein cholinesterase is equal to 0.1 unit per ml.

The following reagents are employed in the reaction:

(A) *The hydrolyzing agents (enzymes)*

(1) Cholinesterase, horse serum (Armour Industrial Chemical Company), specific activity 1.80 units—one unit represents one micromole of acetylcholine hydrolyzed per milligram of enzyme per minute. Solutions were prepared by dissolving the material, purified by the Strelitz procedure in 0.1 M tris buffer, pH 7.40.

(2) Acetylcholinesterase, bovine erythrocytes (Winthrop Labs.), specific activity 1.90 units—one unit equals one micromole of acetylcholine hydrolyzed per milligram of enzyme per minute.

(3) Acetylcholinesterase, eel, specific activity 6.0 units (Ach).

(4) Lipase, porcine pancreas and steapsin, alpha and gamma chymotrypsin.

(5) Beta-chymotrypsin, bovine pancreas (Calbiochem. Co.), activity 6000 units per mg. (ATEE).

(6) Acid phosphatase, potato (Nutritional Biochem. Co.), activity 100 units per mg. (Kornberg).

(7) Acylase (Armour Research Co.), activity 1.0 unit per mg. (Armour).

(B) *Buffers*

(1) Tris buffer.
(a) Tris(hydroxymethyl)aminomethane, pH 7.4 and 8.0, 0.01 and 0.1 M, was prepared by dissolving the appropriate amount of Sigma 7–9 buffer (Sigma Chemical Co.) in distilled water. HCl, 0.1 M, was added to adjust the pH.

(2) Phosphate.
(a) 0.1 M, pH 6.50.

(C) *Substrates*

(1) Indoxyl acetate (non-fluorescent)

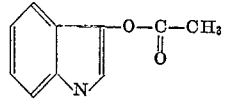

A stock 0.83 M solution of this substrate was prepared by dissolving 145 mg. of the compound in 10 ml. of dioxane.

(2) Resorufin esters (non-fluorescent)
a.

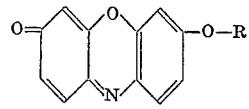

R=COCH$_3$; COC$_2$H$_5$; COC$_3$H$_7$

These esters of resorufin were prepared by treating resorufin with the appropriate acid anhydride and pyridine (3:1) (Table I). The esters were purified by recrystallization from solvents as listed. The elemental analysis on all esters checked within acceptable limits of the calculated amounts.

TABLE I.—RESORUFIN ESTERS, PREPARATION AND PROPERTIES

| Esters | M.P. (deg.) | $\lambda_{max}$, m$\mu$ | $A_m$ | Recryst. solvent |
|---|---|---|---|---|
| Resorufin acetate | [1] 223 d | 450 | $1.42 \times 10^4$ | Ethanol. |
| Resorufin propionate | [2] 177 | 450 | $1.30 \times 10^4$ | Do. |
| Resorufin butyrate | [3] 130 | 440 | $1.24 \times 10^4$ | Benzene. |
| Resorufin benzoate | [4] 203 | 470 | $8.0 \times 10^3$ | Do. |

[1] Literature value 223° d.
[2] Calcd. for $C_{15}H_{11}O_4N$: C, 66.91; H, 4.12; O, 23.77. Found: C, 66.7; H, 4.2; O, 24.0.
[3] Calcd. for $C_{16}H_{13}O_4N$: C, 67.84; H, 4.63; O, 22.59. Found: C, 68.2; H, 4.9; O, 22.4.
[4] Calcd. for $C_{19}H_{11}O_4N$: C, 71.93; H, 3.49; O, 20.17. Found: C, 70.3 H, 3.9; O, 20.0.

An Aminco-Bowman spectrofluorometer equipped with a xenon lamp, an optical unit for proper control of the fluorescence excitation and emission wave lengths, a photomultiplier microphotometer and a Beckman linear recorder was used in all measurements.

According to our invention, the non-fluorescent resorufin esters when hydrolyzed by cholinesterase are converted to the highly fluorescent compound, resorufin. By following the rate of change in fluorescence with time, $\Delta F/\Delta t$, horse serum cholinesterase, in concentrations of 0.000308 to 0.121 unit per ml. was determined with a relative standard deviation of $+1.0\%$ (Table II). In addition to horse serum cholinesterase, the enzymes chymotrypsin, lipase, acylase and phosphatase hydrolyzed the substrates (Table III). The enzyme, acetylcholinestrase, from bovine erythrocytes (B.E.) or from eel, had little effect on any of the substrates.

TABLE II.—DETERMINATION OF CHOLINESTERASE

| Cholinesterase, units/ml. | | | Rel. Error percent | |
|---|---|---|---|---|
| Present | Found (IA) | Found (RBu) | IA | RBu |
| 0.000308 | 0.000310 | 0.000309 | +0.6 | +0.3 |
| 0.000617 | 0.000615 | 0.000617 | −0.3 | 0.0 |
| 0.00123 | 0.00121 | 0.00125 | −1.6 | +1.6 |
| 0.00246 | 0.00249 | 0.00247 | +1.2 | +0.4 |
| 0.00617 | 0.00617 | 0.00614 | 0.0 | −0.5 |
| 0.0017 | 0.0019 | 0.0620 | +0.3 | +0.5 |
| 0.123 | 0.122 | 0.121 | +0.8 | −1.6 |
| | | Rel. std. dev. | +0.90 | +1.0 |

TABLE III.—HYDROLYSIS OF RESORUFIN ACETATE AND BUTYRATE BY VARIOUS ENZYMES

[Ester, $5 \times 10^{-5}$ M, in tris buffer, 0.01 M, pH 7.40. Enzymes, 0.1 ml. of a 1 mg. per ml. solution added]

| Enzyme | $\Delta F/\Delta t$, F Units/minute | |
|---|---|---|
| | Resorufin acetate | Resorufin butyrate |
| Acetylcholinesterase (B.E.) | 0 | 0.050 |
| Acetylcholinesterase (eel) | 0 | 0.010 |
| Horse serum cholinesterase | 0.630 | 0.645 |
| α-Chymotrypsin | 1.810 | 1.145 |
| β-Chymotrypsin | 1.23 | 0.955 |
| γ-Chymotrypsin | 1.29 | 1.12 |
| Acylase | 0.90 | 1.545 |
| Lipase (steapsin) | 0 | 0.84 |
| Lipase (porcine pancreas) | 0 | 2.655 |
| Acid phosphatase | 1.20 | 0.315 |

Steapsin and porcine pancreas lipase had no effect on resorufin acetate but hydrolyzed resorufin butyrate, the order of ease of hydrolysis being the butyrate>propionate >acetate. With horse serum cholinesterase, all substrates were hydrolyzed at approximately the same rate, the butyrate being hydrolyzed somewhat faster. All three chymotrypsins possessed a slightly higher rate with the acetate ester. While the rate of spontaneous hydrolysis follows the order: acetate<propionate<butyrate, resorufin butyrate was used in all enzyme assays. To minimize the rate of spontaneous hydrolysis of resorufin butyrate, all runs were made at pH 7.4, using 0.01 M tris buffer. Under these conditions, the spontaneous rate of hydrolysis was always less than 5%.

The rate of production of resorufin was proportional to the concentrations of alpha, beta and gamma chymotrypsin over the range of 0.00030 to 0.10 mg. per ml. of solution, thus allowing the facile determination of these enzymes. Since the rate of the chymotrypsin catalyzed hydrolysis of resorufin acetate is about five times faster than that of fluorescein dibutyrate, this fluorometric procedure is considered to be the preferred one.

Furthermore, by the method of our invention it has been found possible to measure inhibitor concentrations such as GB (isopropyl methylphosphonofluoridate) at very low enzyme concentrations ($10^{-1}$ to $10^{-4}$ units) by hydrolyzing a non-fluorescent ester indoxylacetate, in the presence of a phosphate buffer having a pH within the range of 6 to 8 to produce a highly fluorescent material, indigo white; registering the rate of change in fluorescence with time, $\Delta F/\Delta t$ (curve A, FIGURE 3); determining the slope of the curve $\Delta F/\Delta t$; adding various concentrations of GB (0.01 to 0.1 gamma per ml.) to the enzyme cholinesterase and registering the rate of change in each instance of the fluorescence with time, $\Delta F/\Delta t$ (curves B, C, D, E, F, FIGURE 3); determining the slope of each curve $\Delta F/\Delta t$ and recording the calibration plots of $\Delta F/\Delta t$ versus the GB concentration whereby the unknown concentration of GB may be determined (FIGURE 4).

In addition to the enzyme, cholinesterase, other enzymes such as acylase, lipase and acid phosphatase effect the hydrolysis of indoxyl acetate, and are determinable by the procedure (Table IV).

TABLE IV.—HYDROLYSIS OF INDOXYL ACETATE BY VARIOUS ENZYMES

[Indoxyl acetate, $2.7 \times 10^{-3}$ M in phosphate buffer, 0.1 M, pH 6.50. Enzymes, 0.1 ml. of a 1 mg. per ml. solution added]

| Enzyme: | $\Delta F/\Delta t$, fluorescence units/min. |
|---|---|
| Horse serum cholinesterase | 3.30 |
| Bovine erythrocyte cholinesterase | 1.15 |
| Acylase | 1.025 |
| α-, β-, γ-chymotrypsin | 0 |
| Steapsin lipase | 1.15 |
| Porcine pancreas lipase | 1.60 |
| Phosphatase | 0.40 |

The rate of hydrolysis of indoxyl acetate by 0.062 and 0.247 unit per ml. of total solution of cholinesterase is given in (Table V). Hydrolysis rates were calculated as the TABLE V.—HYDROLYSIS OF INDOXYL ACETATE (IN PHOSPHATE BUFFER, 0.1 M, pH 6.50) BY CHOLINESTERASE

| Substrate M | $\Delta F$/minute | |
|---|---|---|
| | 0.062 unit/ml. | 0.247 unit/ml. |
| $2.7 \times 10^{-3}$ | 3.25 | 13.0 |
| $1.3 \times 10^{-3}$ | 2.0 | 8.0 |
| $2.7 \times 10^{-4}$ | 1.50 | 6.0 |
| $2.7 \times 10^{-5}$ | 0.69 | 2.7 |
| $2.7 \times 10^{-6}$ | 0.14 | 0.56 |
| $2.7 \times 10^{-7}$ | 0.021 | 0.084 |
| $1.0 \times 10^{-7}$ | 0.0085 | 0.034 |
| $5.0 \times 10^{-8}$ | 0.00425 | 0.017 |
| $2.5 \times 10^{-8}$ | 0.00210 | 0.0084 | increase in fluorescence, $\Delta F$, per unit time. The rate of spontaneous hydrolysis was negligible at all substrate concentrations.

The rate of increase of fluorescence, $\Delta F$/minute, was measurable at concentrations ranging from $2.7 \times 10^{-3}$ M to as low as $2.5 \times 10^{-8}$ M. Using the optimum substrate concentration of $2.7 \times 10^{-3}$ M in phosphate buffer, pH 6.50, concentrations of cholinesterase as low as 0.000308 unit per ml. of solution may be assayed. $\Delta F$/minute was linear over the range of cholinesterase concentrations tested, 0.000308 to 0.060 unit per ml. of solution, with a relative standard deviation of about $\pm 0.90\%$ (Table II).

The indoxyl formed is oxidized to indigo blue, which is non-fluorescent, thus decreasing the sensitivity of this assay. However, at pH's less than 7, a highly fluorescent material is formed that is stable with time and is not oxidized to indigo blue. At more alkaline pH's (>7.5)

the fluorescence of the solution rapidly decreases with time. On addition of ascorbic acid (an antioxidant) to a solution of indoxyl acetate and cholinesterase, a fluorescent material is produced, the fluorescence of which does not decrease with time, but appears to possess a higher fluorescence than the compound formed in the absence of ascorbic acid (Table VI).

TABLE VI.—EFFECT OF pH AND ASCORBIC ACID ON PRODUCTION OF INDOXYL FROM INDOXYL ACETATE

[Indoxyl acetate, $1.7 \times 10^{-3}$ M, ChE, 0.0625 unit per ml. of solution]

| pH | Ascorbic acid | ΔF/min. | Fluorescence, (maximum)[1] |
|---|---|---|---|
| 6.0 [2] | 0 | 0.83 | 24.0 |
|  | 3×10⁻³ | 0.767 | 12.9 |
| 6.5 [2] | 0 | 2.3 | 24.0 |
|  | 3×10⁻³ | 0.98 | 12.0 |
| 6.76 [2] | 0 | 1.5 | [3] 30.0 |
|  | 3×10⁻³ | 0.89 | 14.5 |
| 7.0 [4] | 0 | 1.3 | [3] 28.0 |
|  | 3×10⁻³ | 0.81 | 14.0 |
| 7.2 [5] | 0 | 1.1 | [3] 20.4 |
|  | 3×10⁻³ | 0.60 | 10.1 |
| 7.50 [5] | 0 | 0.72 | [3] 12.0 |
|  | 3×10⁻³ | 0.51 | 6.0 |
| 8.0 [5] | 0 | 0.64 | [3] 4.1 |
|  | 3×10⁻³ | 0.32 | 2.1 |

[1] Total fluorescence yield in units.
[2] McIlvaine buffer.
[3] Unstable fluorescence.
[4] Tris buffer.
[5] Phosphate buffer.

These observations can best be explained if it is assumed that the indoxyl (II) which is first formed is oxidized first to a highly fluorescent compound, indigo white (III), then to the non-fluorescent indigo blue. In the presence of ascorbic acid, indigo white does not form, but only indoxyl, which should be less fluorescent than indigo white. In the absence of ascorbic acid, at pH's of 7 and below, indigo white forms. At pH's >7, indigo white is air oxidized to indigo blue. Since indigo white has extended conjugation, it might be expected that activation would occur at a wave length different from indoxyl. However, the fluorescence excitation curves were identical for indoxyl and indigo white.

The excitation and emission wave lengths for resorufin are 540–570 m$\mu$ and 580 m$\mu$, respectively, and for indoxyl (II) or indigo white (III), the excitation was at 395 m$\mu$ and the emission at 470 m$\mu$. All runs were performed in a constant temperature room.

The $K_m$ values as defined in "Enzymes," Malcolm Dixon and E. C. Webb, 1958, pages 19–30, for the various resorufin esters and for indoxyl acetate were calculated from standard Line-Weaver-Burke plots and are reported in (Table VII).

TABLE VII.—MICHAELIS CONSTANTS FOR VARIOUS FLUOROGENIC SUBSTRATES

[Enzyme, horse serum cholinesterase]

| Substrate: | $K_m$ |
|---|---|
| Resorufin acetate | $8 \times 10^{-5}$ |
| Resorufin propionate | $6.7 \times 10^{-5}$ |
| Resorufin butyrate | $4.0 \times 10^{-5}$ |
| Indoxyl acetate | $3.4 \times 10^{-4}$ |

Although the resorufin esters possess more favorable $K_m$'s than the indoxyl acetate, the rate of hydrolysis of the indoxyl acetate is much faster than that of the resorufin esters. The indoxyl acetate probably possesses a more favorable $K_3$. Other advantages of indoxyl acetate over resorufin acetate or butyrate as a fluorescent substrate include its greater stability toward spontaneous hydrolysis and the larger difference between excitation and emission wave lengths. An advantage of the resorufin esters is the greater fluorescence of resorufin, which permits the assay of lower substrate concentrations ($10^{-8}$ M) for resorufin acetate compared to ($2.5 \times 10^{-8}$ M) for indoxyl acetate. The sensitivity for either for assay of cholinesterase is about the same (Table II). Since these substrates are attacked by a number of different enzymes, the procedures described are not truly specific. Hence the identity of other enzymes present in the sample to be determined must be established.

Example 1

To 2.85 ml. of tris buffer, 0.01 M, pH 7.4, is added 0.15 ml. of $10^{-3}$ M resorufin butyrate, the Aminco Bowman is set to the proper wave lengths and the instrument is adjusted to read zero. At zero time, 0.1 ml. of a solution of the enzyme to be assayed (containing 0.00090 to 0.50 units of cholinesterase), is added, and the change in the fluorescence of the solution, due to hydrolysis of substrate, is then recorded versus time, usually for a period of two minutes. The slope of this curve $\Delta F/\Delta t$, is determined, and from recorded calibration plots of $\Delta F/\Delta t$ versus enzyme concentration, the activity of the unknown enzyme concentration may be measured.

Example 2

To 2.90 ml. of 0.1 M phosphate buffer pH 6.5 is added 0.1 ml. of 0.083 M indoxyl acetate, the Aminco Bowman is set to the proper wave lengths and the instrument is adjusted to read zero. At zero time, 0.1 ml. of a solution of the enzyme to be assayed (containing 0.00090 to 0.50 units of cholinesterase), is added, and the change in fluorescence of the solution, due to hydrolysis of substrate, is then recorded versus time usually for a period of two minutes. The slope of this curve $\Delta F/\Delta t$ is determined, and from recorded calibration plots of $\Delta F/\Delta t$ versus enzyme concentration, the activity of the unknown enzyme concentration may be measured.

EXAMPLE 3

To 2.90 ml. of 0.1 M phosphate buffer pH 6.5 is added 0.1 ml. of 0.083 M indoxyl acetate and 0.1 ml. of GB containing 0.01 to 0.1 $\mu$g., the Aminco Bowman is set to the proper wave lengths and the instrument is adjusted to read zero. At zero time, 0.1 ml. of a solution of cholinesterase, containing 0.1 unit is added, and the change in fluoroescence of the solution, due to hydrolysis of substrate, is then recorded versus time, usually for a period of two minutes. The slope of this curve $\Delta F/\Delta t$ is determined, and from recorded calibration plots of $\Delta F/\Delta t$ versus GB concentration, the concentration of GB may be measured.

As set forth in the above disclosure the process of this invention may be employed in the following manner:

(1) Assay of enzymatic preparations in production and quality control.

(2) Assay of anticholinesteratic pesticides, for example; Systox (O,O-diethyl 2-ethyl thio ethyl phosphorothioate).

(3) Detection of cholinesterase in blood-diagnostic test.

Having now particularly described and ascertained the nature of our said invention and in what manner the same is to be performed, we declare that what we claim is:

1. A process of measuring enzyme activity comprising the steps of:
 (a) providing a substrate having very low concentrations ($10^{-6}$ M to $10^{-8}$ M) of non-fluorescent resorufin ester, said ester selected from acetate, propionate, butyrate, and benzoate;
 (b) hydrolyzing in the presence of a buffer taken from the group consisting of tris buffer (tris[hydroxy methyl]aminomethane) and phosphate buffer, said non-fluorescent ester with an enzyme taken from the group consisting of cholinesterase and phosphatase at pH's in the range of 6 to 10 to produce highly fluorescent compounds;
 (c) registering the rate of change in fluorescence of said fluorescent compounds with time, $\Delta F/\Delta t$;
 (d) determining the slope of the curve $\Delta F/\Delta t$;
 (e) recording the calibration plots of $\Delta F/\Delta t$ versus enzyme activity whereby the unknown activity of enzyme may be determined.

2. The process of measuring enzyme activity as defined in claim 1 employing resorufin butyrate with cholinesterase at a pH less than 8.0 to produce highly fluorescent resorufin.

3. The process as defined in claim 2 employing cholinesterase having an activity within the range of 0.000308 to 0.121 unit per ml. of solution.

4. The process as defined in claim 3 having a pH of 7.4.

5. The process as defined in claim 4 employing a 0.01 M tris buffer.

6. The process as defined in claim 1 employing resorufin acetate.

7. The process as defined in claim 6 wherein the substrate concentration of resorufin acetate is $10^{-8}$ M.

8. A process of measuring enzyme activity comprising the steps of:
 (a) providing a substrate having very low concentrations ($10^{-6}$ M to $10^{-8}$ M) of non-fluorescent resorufin ester, said ester selected from acetate, propionate, butyrate, and benzoate
 (b) hydrolyzing in the presence of a phosphate buffer, said non-fluorescent ester, with the enzyme cholinesterase at said pH of 6.5 to produce highly fluorescent resorufin;
 (c) registering the rate of change in fluorescence of said fluorescent compounds with time, $\Delta F/\Delta t$;
 (d) determining the slope of the curve $\Delta F/\Delta t$,
 (e) recording the calibration plots of $\Delta F/\Delta t$ versus enzyme activity whereby the unknown activity of enzyme may be determined.

9. The process as defined in claim 8 employing the enzyme cholinesterase in the range of approximately 0.000308 units to 0.121 per ml. of solution.

References Cited

UNITED STATES PATENTS 3,049,411   8/1962   Gelman et al. ____ 195—103.5 X

OTHER REFERENCES

Colowick et al.: Method in Enzymology, vol. IV, page 185, 1957.

ALVIN E. TANENHOLTZ, *Primary Examiner.*